(12) United States Patent
Candy et al.

(10) Patent No.: US 8,854,043 B2
(45) Date of Patent: Oct. 7, 2014

(54) METHOD FOR DISPLAYING METAL DETECTION INFORMATION

(71) Applicant: Minelab Electronics Pty Limited, Torrensville (AU)

(72) Inventors: Bruce Halcro Candy, Torrensville (AU); Gregory Peter Harmer, Torrensville (AU); Laurentiu Stamatescu, Torrensville (AU); Pavel Valentine Kursa, Torrensville (AU)

(73) Assignee: Minelab Electronics Pty Limited, Torresville (AU)

( * ) Notice: Subject to any disclaimer, the term of this patent is extended or adjusted under 35 U.S.C. 154(b) by 11 days.

(21) Appl. No.: 13/786,091

(22) Filed: Mar. 5, 2013

(65) Prior Publication Data

US 2013/0234716 A1      Sep. 12, 2013

(30) Foreign Application Priority Data

Mar. 6, 2012  (AU) ................................. 2012900869

(51) Int. Cl.
   *G01V 3/10*      (2006.01)
(52) U.S. Cl.
   CPC ........................................ *G01V 3/10* (2013.01)
   USPC ......................................................... 324/326

(58) Field of Classification Search
   CPC .......... G01V 3/10; G01V 3/107; G01V 3/101; G01V 9/007
   See application file for complete search history.

(56) References Cited

U.S. PATENT DOCUMENTS

| 5,886,664 | A | 3/1999 | Yujiri et al. |
| 6,529,007 | B2 * | 3/2003 | Ott et al. ........................ 324/327 |
| 6,653,838 | B2 * | 11/2003 | Candy ............................ 324/329 |
| 2010/0148960 | A1 | 6/2010 | Candy |
| 2011/0037462 | A1 | 2/2011 | Bosnar |

FOREIGN PATENT DOCUMENTS

| WO | WO 01/71387 | 9/2001 |
| WO | WO 2011/011820 | 2/2011 |

* cited by examiner

*Primary Examiner* — Tung X Nguyen
(74) *Attorney, Agent, or Firm* — Beyer Law Group LLP

(57) ABSTRACT

A method for detecting an electrically conductive target in a soil using a metal detector, including: generating a transmit magnetic field for transmission into the soil based on a transmit signal; receiving a receive magnetic field; providing a receive signal induced by the receive magnetic field; processing the receive signal to produce a processed signal; processing a duration of the receive signal, the duration begins after a time the processed signal exceeds a threshold value and ends after a time the processed signal no longer exceeds the threshold value, to produce more than one estimations indicative of a presence of the electrically conductive target when the target is within an influence of the transmit magnetic field; and presenting graphically the more than one estimations.

16 Claims, 9 Drawing Sheets

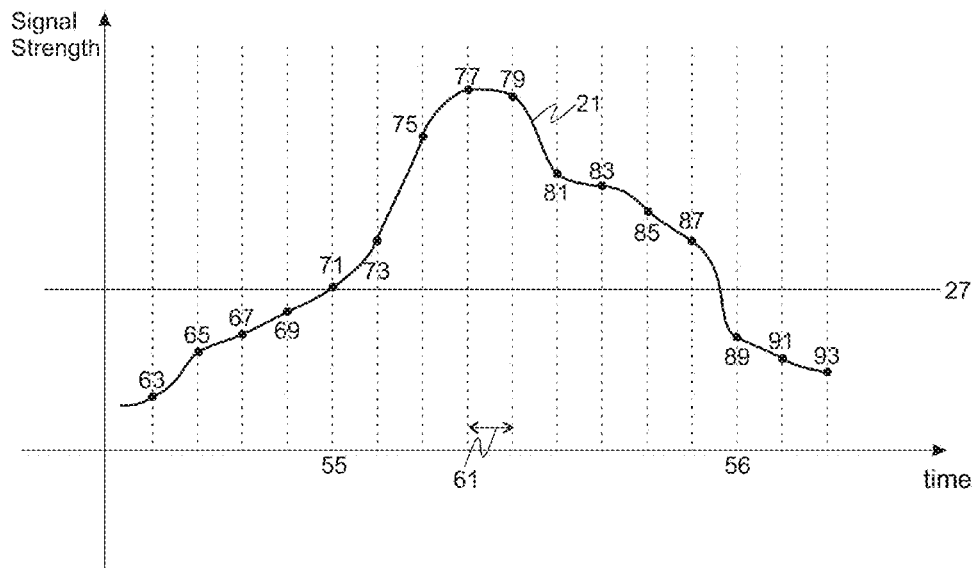
*Figure 5a*
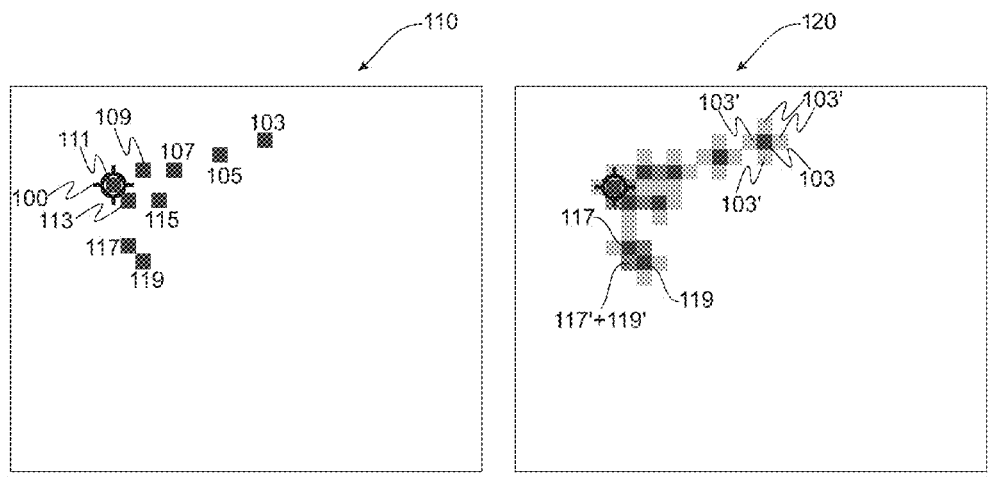
*Figure 5b*                *Figure 5c*

METHOD FOR DISPLAYING METAL DETECTION INFORMATION

TECHNICAL FIELD

This invention relates to a method and an apparatus for displaying metal detection information in relation to characteristics of one or more targets to a user.

INCORPORATION BY REFERENCE

This patent application claims priority from: Australian Provisional Patent Application No 2012900869 titled "A Display Method of a Metal Detector" filed Mar. 6, 2012. The entire content of this application is hereby incorporated by reference.

BACKGROUND ART

A common form of metal detectors transmits a transmit magnetic field and receives a receive magnetic field radiated by elements of the environment that are influenced by that transmit magnetic field. Examples of this form of metal detectors include detectors that are used for detecting explosive landmines, unexploded ordnance, precious native metals, coins, jewellery and caches of similar items, in ground. Development of metal detectors has involved not only the improvement of sensitivity to sought objects (targets) but also include, through processing signals due to the receive magnetic field radiated by the sought objects, the separation of signals due to their radiated fields from signals due to fields radiated by objects in which the detectorist has less interest, as well as the classification of the nature of the sought objects.

Transmission, reception of the receive magnetic field and processing of the signals due to the receive magnetic field are effected through electronic circuitry.

These electronic metal detectors usually include transmit electronics for generating a repeating transmit signal cycle of a fundamental period applied to an inductor, also known as a transmit coil, that transmits a changing magnetic field often referred to as a transmit magnetic field.

Metal detectors contain receive electronics which processes a receive signal from an induced voltage due to a receive magnetic field to produce an indicator signal, the indicator signal at least indicating the presence of at least some sought objects (for example, metallic targets such as gold, jewellery etc.) within the influence of the transmit magnetic field.

There is a problem with such an operation, whenever the receive signal includes a signal due to the presence of one or more desired metallic objects, it is often mixed with, or contaminated by, unwanted signals, for example signals due to unwanted buried objects (such as ferrous objects), background noises, and signals due to soil or ground. Indeed, it is possible that a receive signal that is composed entirely of unwanted signals will be able to elicit the indication of a target, even when there is no desired target present.

In metal detectors that classify detected targets as well as merely detecting them, contaminated receive signals, if not further processed, can result in erroneous classification of the targets, for example, by classifying a non-ferrous object as a ferrous object. This can further lead to reduced sensitivity to small or deeply-buried sought objects. Acceptable detection performance can be difficult to achieve without further processing of the receive signal.

BRIEF SUMMARY OF THE INVENTION

According to a first aspect of the present invention, there is provided a method for detecting an electrically conductive target in a soil using a metal detector, including: generating a transmit magnetic field for transmission into the soil based on a transmit signal; receiving a receive magnetic field; providing a receive signal induced by the receive magnetic field; processing the receive signal to produce a processed signal; processing a duration of the receive signal, the duration begins after a time the processed signal exceeds a threshold value and ends after a time the processed signal no longer exceeds the threshold value, to produce more than one estimations indicative of a presence of the electrically conductive target when the target is within an influence of the transmit magnetic field; and presenting graphically the more than one estimations.

In one form, the method further includes the step of: producing at least one identification indicative of a presence of the electrically conductive target based on one or more of the more than one estimations.

In one form, each of the more than one estimations includes two numbers.

In one form, each of the more than one estimations are presented graphically in a 2D form.

In one form, the method further includes the step of: smoothing graphically the 2D form of each of the more than one estimations.

In one form, each of the more than one estimates are graphically presented such that the more than one estimates graphically represent a trail.

In one form, the method further includes the step of: presenting graphically a cursor indicating the identification, to differentiate the identification from at least one of the more than one estimations.

In one form, each of the more than one estimations is presented in colour and wherein an intensity of the colour is dependent on a confidence level of each of the more than one estimations.

In one form, the confidence level is dependent on an instance of a signal-to-noise ratio of the receive signal.

In one form, the method further includes the step of: removing the more than one estimations after a predetermined time.

In one form, the method further includes the step of: removing the more than one estimations after each swing of the metal detector.

In one form, each of the more than one estimations is presented in colour and wherein a different colour scheme is selected to indicate different electrically conductive targets detected by the metal detector.

In one form, each of the more than one estimations is presented in colour and wherein an intensity of the colour is accumulated.

According to a second aspect of the present invention, there is provided a metal detector configurable to perform the method of the first aspect.

To assist with the understanding of this invention, reference will now be made to the drawings:

BRIEF DESCRIPTION OF THE DRAWINGS

FIG. 5a depicts a process of a target signal according to the present invention;

FIG. 5b depicts a presentation of an identification to a user according to the present invention;

FIG. 5c depicts a presentation of estimates and an identification to a user according to the present invention when an anti-aliasing or smoothing function is applied;

DETAILED DESCRIPTION OF THE INVENTION

Figure 1:
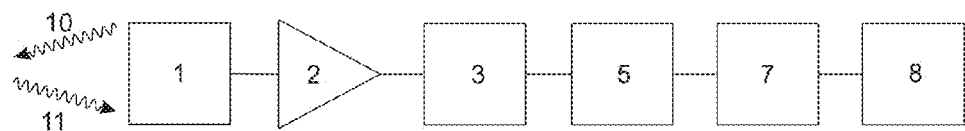
FIG. 1 depicts an operational block diagram of a metal detector.

The operational block diagrams of a metal detector is depicted in FIG. 1. Sensor head 1 contains a transmit coil and a receive coil and electronics to supply a repeating transmit signal cycle to the transmit coil. In some detectors, the transmit coil and the receive coil are the same single coil.

A transmit magnetic field 10 is emitted from the transmit coil of the sensor head 1. The receive magnetic field 11 is some of the transmit magnetic field 10 radiated from nearby elements of the environment, for instance, ground, non-ferrous conductive targets and unwanted objects, for example some types of ferrous objects. The receive magnetic field 11 may also include magnetic fields generated by sought objects due to the influence of the transmit magnetic field 10.

The receive magnetic field 11 detected by the sensor head 1 produces a receive signal, which is fed from the sensor head 1 to an amplifier 2 that, in turn, feeds the amplified receive signal to a synchronous demodulator 3. The synchronous demodulator 3 samples the amplified receive signal at one or more receive periods that are synchronous with the repeating transmit signal cycle applied to the transmit coil within the sensor head 1. The synchronous demodulator 3 may include more than one synchronous demodulator module, each using a different synchronous demodulating function. Alternatively, the synchronous demodulator 3 may be a digital synchronous demodulator when the receive signal is converted to digital form with an analog-to-digital converter (not shown) prior to processing by synchronous demodulator 3.

The synchronous demodulator 3 produces a plurality of channels, each of which is a function of some components of the original receive signal. These channels are fed to the signal processing unit 5 to produce a target signal. The target signal is further processed by display processing unit 7 (which may be part of signal processing 5) to produce an indicative output signal to a user through a graphical display 8.

Figure 2:
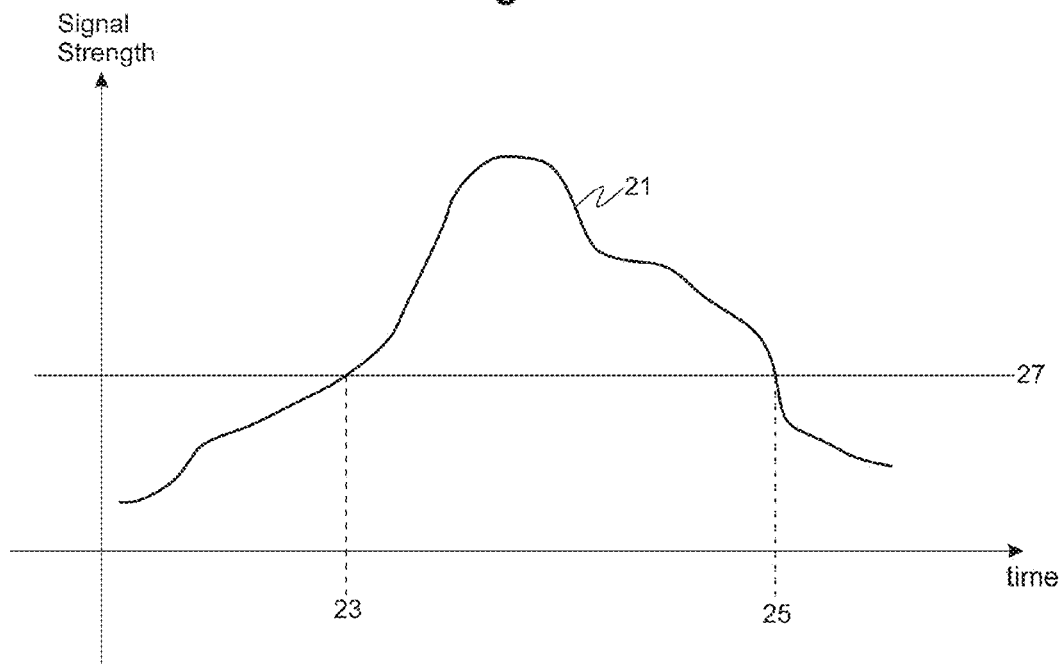
FIG. 2 depicts a target signal which is a function of one or more of the demodulated channels.

An example of a target signal is shown in FIG. 2 as trace 21. The target signal is a function of the synchronously demodulated channels fed to the signal processing unit 5. The target signal indicates whether there is a high probability that there is a target in a detection zone. In this example, the target signal (trace 21) is compared with a threshold value 27. The duration between time 23 and 25, during which trace 21 is above the threshold 27, defines a target detection period. Information of the channels, that corresponds to a target detection period, is processed to produce an identification, which contains information about the one or more characteristics or type of a target detected. For example, such processing may produce an identification indicating that the target is one of a 20-cent coin, or a ferrous nail, or a conductive target with time constant of 30 microseconds, etc.

The identification may take many forms, for example, it is possible to have the identification including two numerical numbers (x, y), each of the x and y representing a characteristics of a detected target. For example, x can represent the conductivity and y the inductivity of the target. The inductivity being a function of the reactive component of the receive signal.

Figure 3:
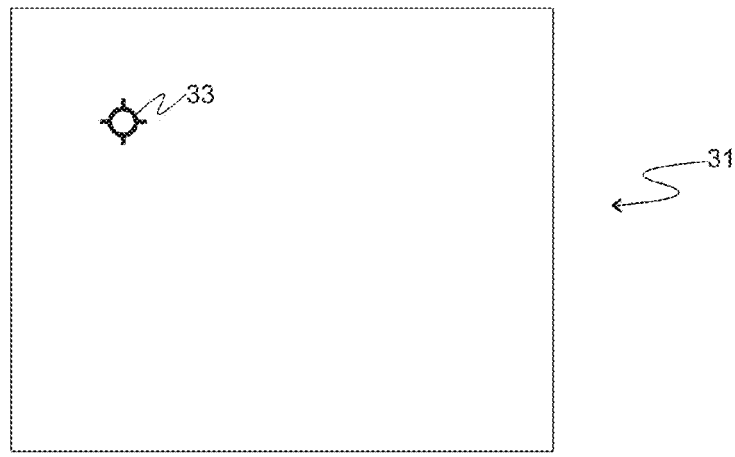
FIG. 3 depicts a presentation of an identification to a user according to a known method.

FIG. 3 depicts how such an identification can be presented to a user. Display 31 depicts a cursor 33 positioned in accordance with the two numerical numbers (x, y), with x value corresponds to a position along the horizontal axis of the display 31 and y value corresponds to the vertical axis of the display 31. Experienced users may, by observing the position of the cursor, be able to confirm the characteristics or type of the target detected. Alternatively, the display can include a short narrative or a simple presentation indicating the characteristics or type of the target detected, for example by displaying a phrase "20-cent coin", "ferrous nail" etc., or by displaying a picture showing a "20-cent coin", "ferrous nail" etc.

However, by processing a whole target detection period (such as the one between time 23 and time 25 of FIG. 2) to produce one single identification, weaker signals from a smaller or deeper target may be masked by stronger signals from a close, larger target. For example, when two targets of different types are located near each other, say a ferrous nail and a 20-cent coin, and assuming that the same target detection period includes signals from the ferrous nail and the 20-cent coin, the display processing unit 7 will only produce one identification for that target detection period. Thus, the display 8 will include indication of the type of either ferrous nail or 20-cent coin, but not both on the display 8, depending on which of the signals is stronger. Accordingly, the presence of one of the two targets is not indicated to the user. The situation is worse when the density of targets is high, as more targets might not be detected.

Figure 4:
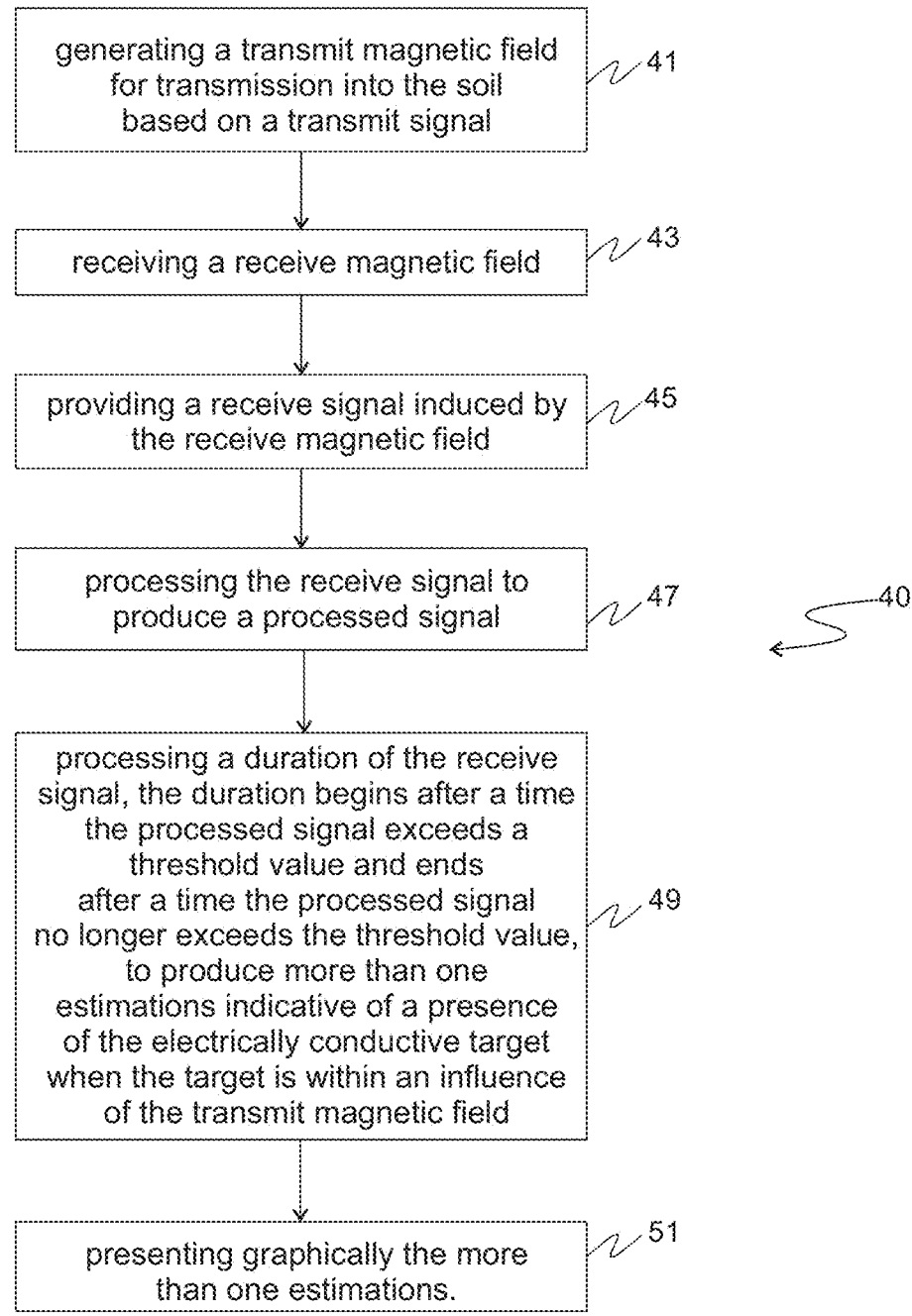
FIG. 4 depicts a method according to the present invention.

FIG. 4 depicts a method 40 in accordance with the present invention to at least partly overcome this problem. In particular, the method 40 requires first generating a transmit magnetic field for transmission into the soil based on a transmit signal 41, then receiving a receive magnetic field 43. The receive magnetic field in turn induces a receive signal which is provided to a signal processing unit 45. The signal processing unit then processes the receive signal to produce a processed signal 47. An example of the processed signal is shown as the target signal (trace 21) in FIG. 2. Based on the processed signal, the signal processing unit processing a duration of the receive signal, the duration begins after a time the processed signal exceeds a threshold value and ends after a time the processed signal no longer exceeds the threshold value, to produce more than one estimations indicative of a presence of the electrically conductive target when the target is within an influence of the transmit magnetic field 49. The more than one estimations are then presented graphically 51.

Reference is made to FIG. 5a to illustrate in detail a way how the method shown in FIG. 4 works. The trace 21, threshold 27 of FIG. 2 is reproduced in FIG. 5a. The sampling of trace 21 is performed after every time interval 61, at points 63, 65, 67, 69, 71, 73, 75, 77, 79, 81, 83, 85, 87, 89, 91 and 93. When a point is below the threshold 27, for example points 63, 65, 67, 69, 89, 91 and 93, the signal processing unit assumes that there is no target detected. When a point is equal to or above the threshold 27, for example points 71, 73, 75, 77, 79, 81, 83, 85 and 87, the signal processing unit assumes that there is a target, and thus channels from synchronous demodulator corresponding to the time of each point are processed for each point to produce an estimate of the identification for each processed point. For example, for point 71, an estimate is produced, for point 73, another estimate is produced, and so on until point 87. These estimates are continually presented to the user in some form as the estimates are calculated at each time interval. A number of methods can be used to process the estimates to produce an effective visual display of the estimates as they are continually calculated. When all the points are processed and all the estimates are produced, an identification is produced. The identification can be based on one or more of the estimates, for example, one of the estimates may be used as the identification, or all the estimates may be averaged, weighted or not, to produce the identification.

The estimates take a same form as the identification. Thus, the estimates may include two numerical numbers (x, y), each of the x and y representing a characteristic of a detected target. For example, x can represent the conductivity and y the inductivity of the target.

The estimates can be presented continually as the estimates are calculated, or at the same time when the identification is produced and presented.

FIG. 5b depicts a display 110 illustrating the presentation of estimates and an identification. Markers 103, 105, 107, 109, 111, 113, 115, 117, 119 corresponds to estimates of points 71, 73, 75, 77, 79, 81, 83, 85 and 87 of FIG. 5a. In this example, estimate of point 79 is chosen as the identification, and a cursor 100 is placed at marker 111 to indicate that it is chosen as the identification. It is not necessary for the identification and the corresponding cursor to be place at the same location as one of the estimates, for example, if an average, or weighted average was employed to produce the identification.

In one embodiment, each marker displayed can be enhanced with one or more anti-aliasing or smoothing templates.

For each marker in a display 120 of FIG. 5c, additional extensions can be presented at the four sides of the marker (which is a square marker in the embodiment as shown). For example, marker 103 can have four extensions 103' as shown in FIG. 5c. For the purpose of anti-aliasing or smoothing, the extensions are displayed with lower colour intensity, lower colour tone, or at a lower position on a colour map, as compared to that of the corresponding marker. In the case of overlapping extensions, the colour intensity, colour tone or position on a colour map can be increased, for example, as shown in FIG. 5c where the overlapping 117' and 119' is presented with a higher colour intensity, colour tone or position on a colour map as compared to that of 117' or 119' alone.

Figure 6A:
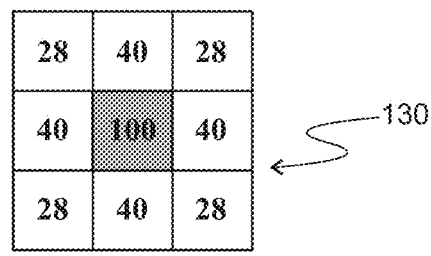
FIG. 6a depicts an anti-aliasing or smoothing template.
Figure 6B:
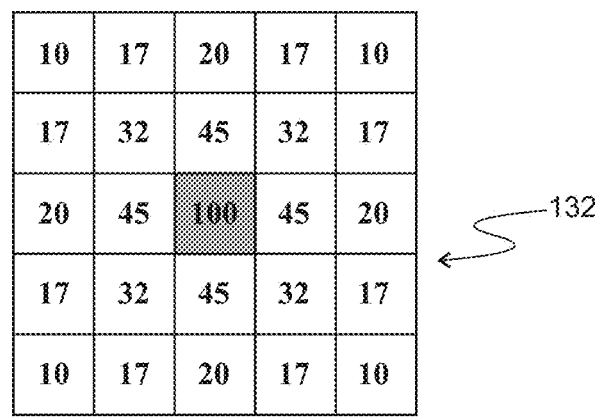
FIG. 6b depicts another anti-aliasing or smoothing template.

There are of course many other ways to define an anti-aliasing or smoothing template. FIGS. 6a and 6b show two examples. Rather than just four extensions from the four sides of the square marker, there may be 8 extensions with the percentage of the colour intensity, colour tone or position on a colour map shown on the template 130 in FIG. 6a. The element marked with "100" in the middle is the original marker, indicating the percentage of the intensity, and the outside elements on the extensions, where the numbers indicate the respective percentage of the intensity as compared to that of the original marker. Another template 132 with 24 extensions is shown in FIG. 6b. Again, the element marked with "100" in the middle is the original marker and the others are the extensions.

Figure 7A:
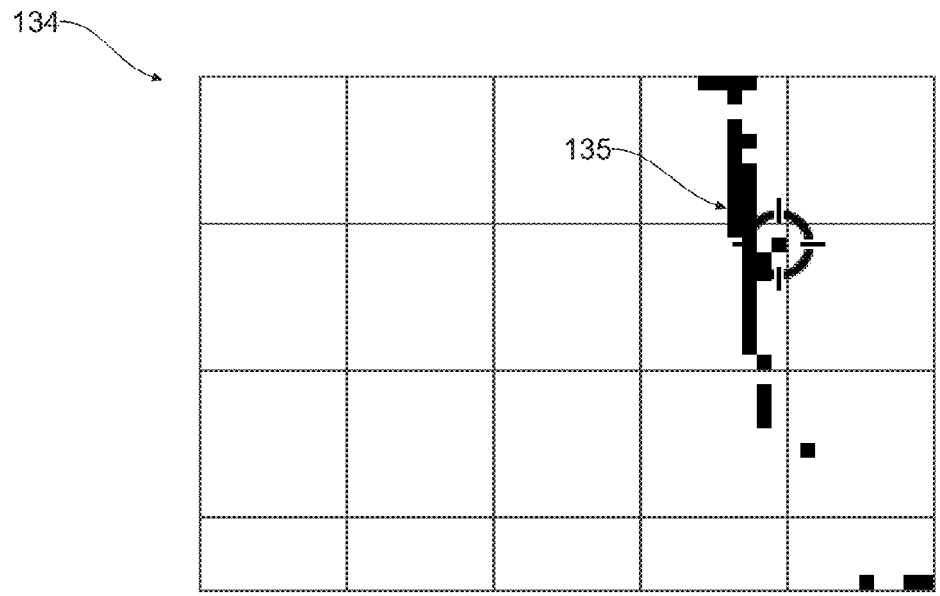
FIG. 7a depicts an example of a presentation of estimates and an identification without an anti-aliasing or smoothing function applied.
Figure 7B:
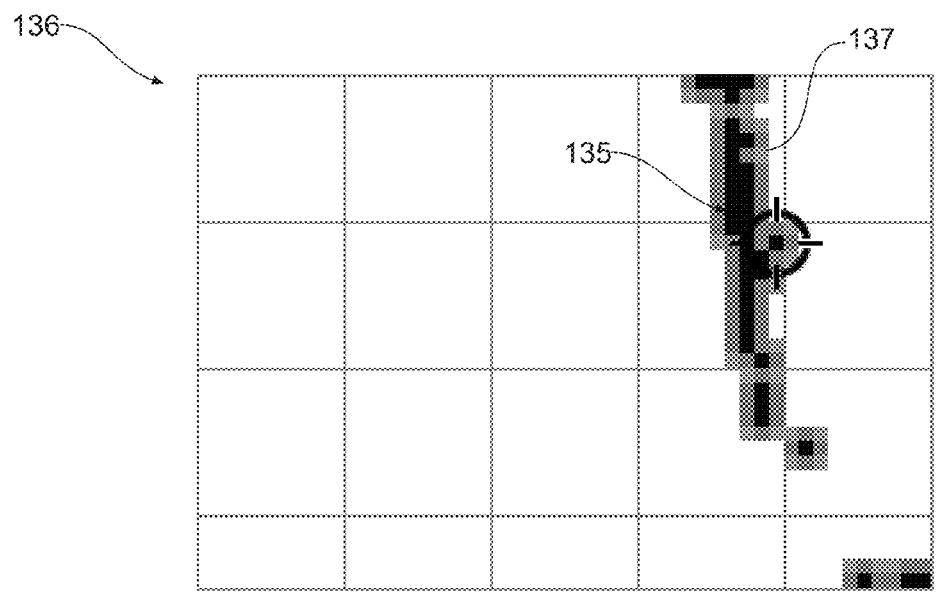
FIG. 7b depicts an example of a presentation of estimates and an identification with an anti-aliasing or smoothing function applied.

FIGS. 7a and 7b illustrate the effectiveness of the use of anti-aliasing or smoothing templates. Display 134 shows markers 135 without any anti-aliasing or smoothing template applied. Each square marker corresponds to a processed point during a target detection period. Display 136, on the other hand, shows markers 135 with a simple eight-extension anti-aliasing or smoothing template applied 137.

In practice, it is possible to display, simultaneously, markers (representing estimates and identifications) from different target detection periods. In those cases, identifications for different target detection periods can be indicated using more than one cursor, or only the newest identification is indicated with the only one cursor.

The colour intensity, colour tone or position on a colour map can be adjusted depending on the confidence level of each of the markers (which can be an estimate or an identification). The confidence level provides an indication of how confident the signal processing unit is with the accuracy of the estimate or identification of the markers. The higher the confidence level, the higher the probability that the display is presenting accurate results; the converse also applies. Essentially, the confidence level should give an indication of the variance of a number of estimates or identifications of the same target. In one embodiment, the confidence level is dependent on a signal-to-noise ratio. More complex calculations may be involved to produce the confidence level.

Figure 8A:
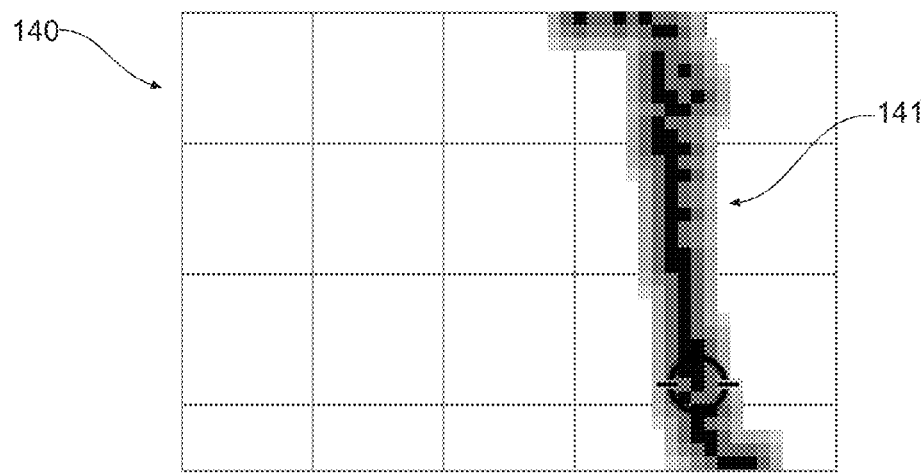
FIGS. 8a to 8c depict adjustments of colour intensity, colour tone or position on a colour map depending on the confidence level.
Figure 8B:
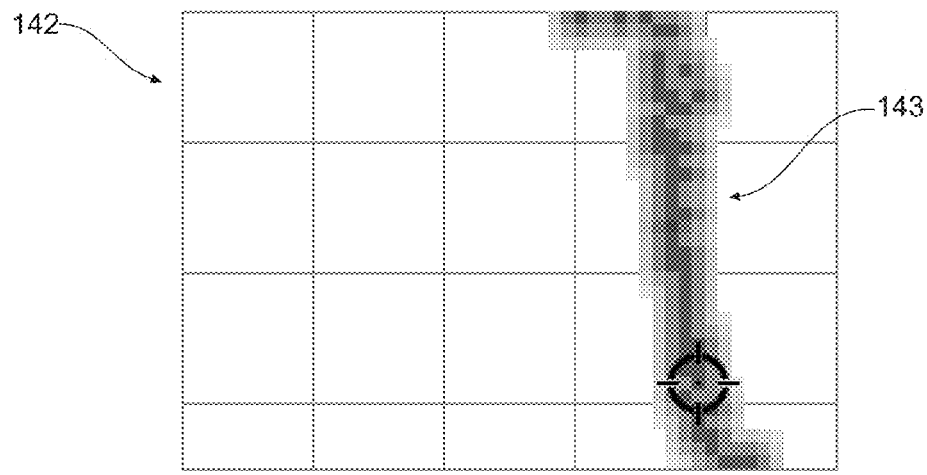
Figure 8C:
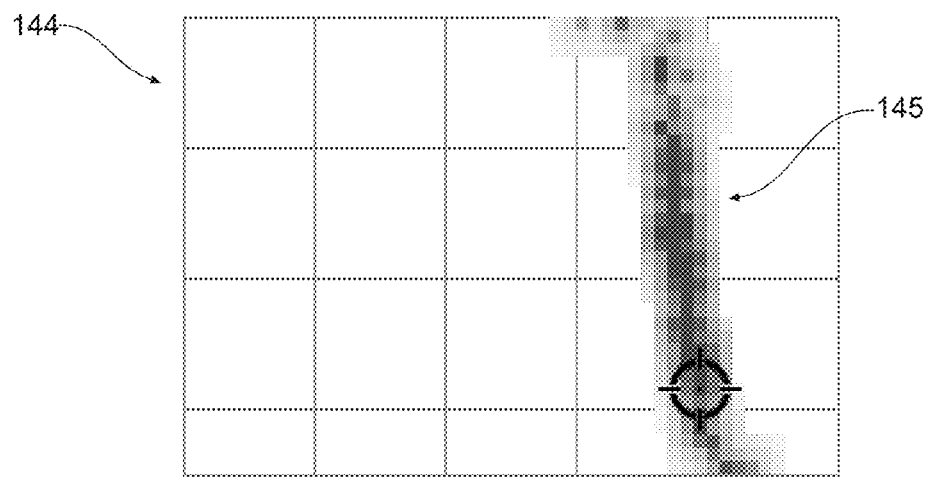

When detecting targets with weak receive signals, there may be an issue with using confidence to determine the colour intensity, colour tone or position on a colour map of the markers. This is because weak targets will have low confidence levels and thus will have a low colour intensity, colour tone or position on a colour map, as seen by the display 144 and markers 145 depicted in FIG. 8c. If the confidence level was ignored and artificially set to 100% for all the markers, the result would be as depicted by display 140 in FIG. 8a. A compromise between the two extreme cases as shown by displays 140 (and markers 141) and 144 (and markers 145) is to coerce the confidence between two values, 50% and 100% for example. The result of coercing the confidence is shown by display 142 and markers 143 depicted in FIG. 8b. This means that weak signals can still be clearly seen as the minimum confidence is always at least 50%, but stronger signals will also be able to be discerned as the confidence can still reach the maximum of 100%.

During use, and over a number of detection periods, the markers and the corresponding extensions will populate the entire display if they are not removed or handled in an appropriate manner.

In one embodiment, markers and extensions are removed at the start of each duration of a target detection period.

In another embodiment, markers are removed after a predetermined time, for example, 30 seconds.

In another embodiment, the oldest marker is removed when a new marker is added and when a predetermined number of markers is being displayed, for example, when there can only be 50 markers on display at one time.

In another embodiment, markers and extension are gradually removed, or faded. This may be known as the Target Trail setting, as it gives the impression of a trail on the display during the detection duration.

Figure 9A:
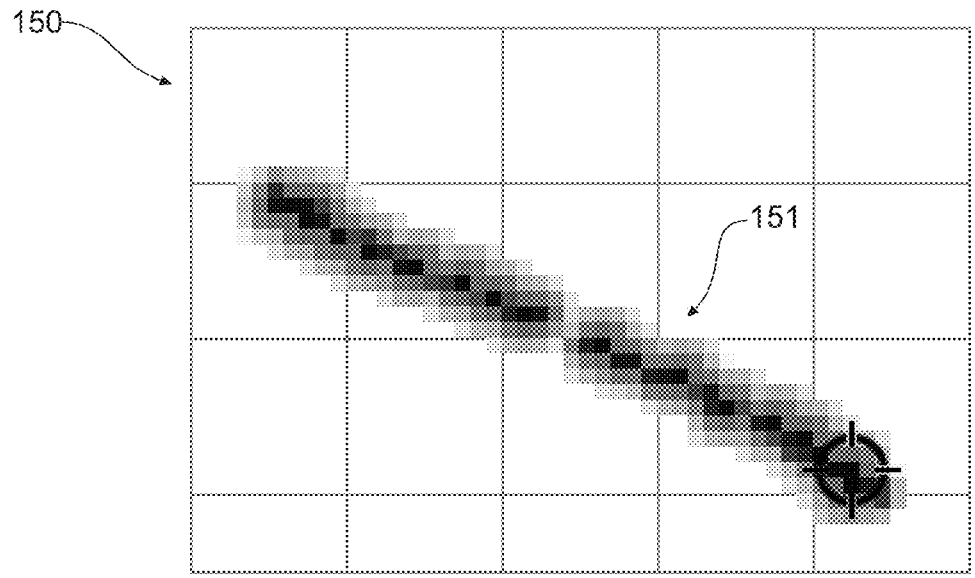
FIGS. 9a and 9b depict embodiments on how the markers can be manipulated to improve presentation on display, with 9b depicting the function of Target Trail.
Figure 9B:
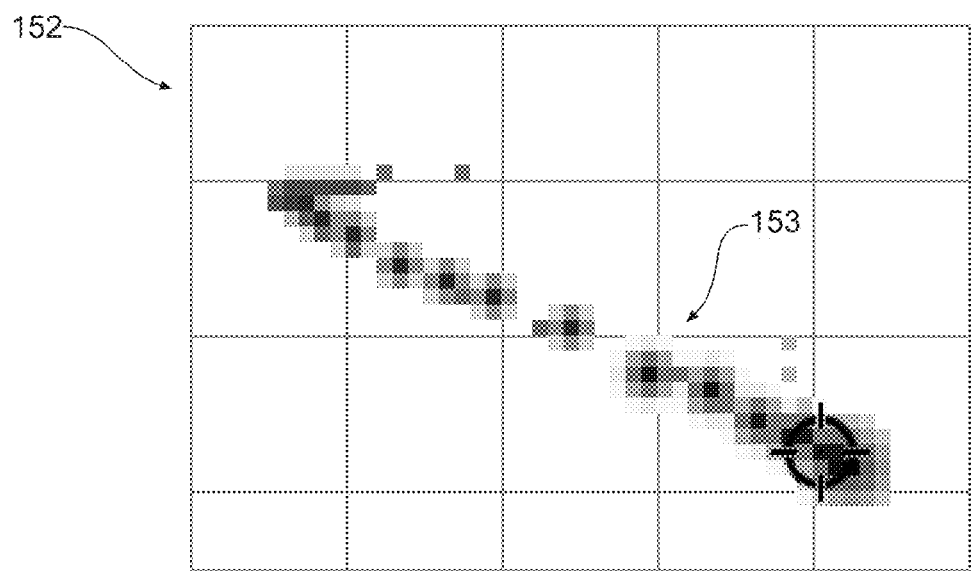

FIGS. 9a and 9b show an example of passing over two targets that are physically close together and how the handling of the markers affects the display. FIG. 9a shows display 150 having no fading effect on markers 151. While the display of all the markers during the duration gives an indication that more than one target is present, and the possible indication of the identification of each target, it is unclear which of the targets is at the start of the duration and which of the targets is at the end of the duration. FIG. 9b shows display 152 with markers 153 having the same detection data displayed as FIG. 9a, but with fading effect. The amount of fading is determined by the 'age' of the marker. When a marker (and its extensions) is displayed, it is aged and starts to fade as it gets older. This means its colour intensity, colour tone or position on a colour map decreases with age. If new markers or extensions are added to the display and there is an existing marker or extension at the same position, then the one with the highest colour intensity, colour tone or position on a colour map is displayed. If it was updated the age is reset. It is possible, therefore, that the extensions displayed around a marker may have different ages.

The age of a marker or extension can be determined in a number of ways. The simplest way is to increment the age of the markers and extensions every time sample. This will fade the display whether there is a detection or not. Alternatively, the age of the markers and extensions is only incremented when there is a sample during the detection duration. This will pause the display between detection durations. Additionally, the age of the markers and extensions could be incremented (by one or more intervals) when the sensor head reaches the end of a swing. This will require some type of position measurement system for the sensor head; the use of an accelerometer would suffice for example.

In one embodiment, it is possible to display an accumulation of markers and extensions without any removal (or fading) of any marker and extension. This may be known as the Heat Map setting. When triggered, none of the markers and extensions is removed or aged, even when new markers and extensions are added to the display. Rather, all markers and extensions are retained to build up an intensity based map on the display.

When there is any overlapping of the markers and the extensions, the colour intensity, colour tone or position on a colour map at an overlapping point is increased according to a predetermined algorithm or scheme. For example, to avoid the display getting saturated too quickly (i.e. all the markers and extensions reach their maximum value), the colour intensity, colour tone or position on a colour map of the markers may be attenuated before the accumulation process. This essentially increases the amount of averaging that occurs before saturation and produces a smoother intensity map.

Figure 10:
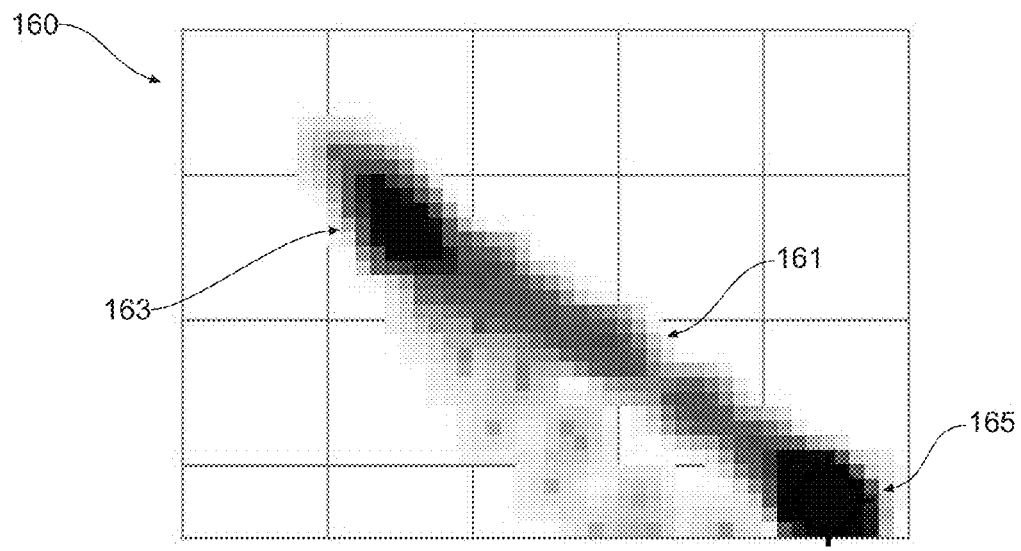
FIG. 10 depicts the function of Heat Map.

FIG. 10 depicts one example of a Heat Map. The display 160, shows accumulated colour intensity, colour tone or position on a colour map of markers 161 (including extensions). The Heat Map with very high colour intensity, colour tone or position on a colour map (for example areas 163, 165) indicates a high probability of a detection of that type or types of targets detected.

In one embodiment, it is possible to employ aspects of both the previous embodiments, Target Trails and Heat Map. In such a scenario, the resulting display would both fade the markers and extensions according to some criteria, and accumulate the markers and extensions according to some other criteria.

Depending on the type of signal processing being utilised, and when there is more than one type of target in the ground, it is possible that more than one estimation or identification is calculated at each time interval, and hence more than one identification is produced at the end of the detection duration, even when there is only one detection duration. For example, if there are two targets, a 20-cent coin and a ferrous nail, the signal processing may be able to provide two outputs, one saying there is a 20-cent coin present with a given confidence, and another output saying there is a ferrous nail present with another given confidence. In this scenario, each of the outputs from the signal processing can have a different colour scheme or colour map.

Figure 11:
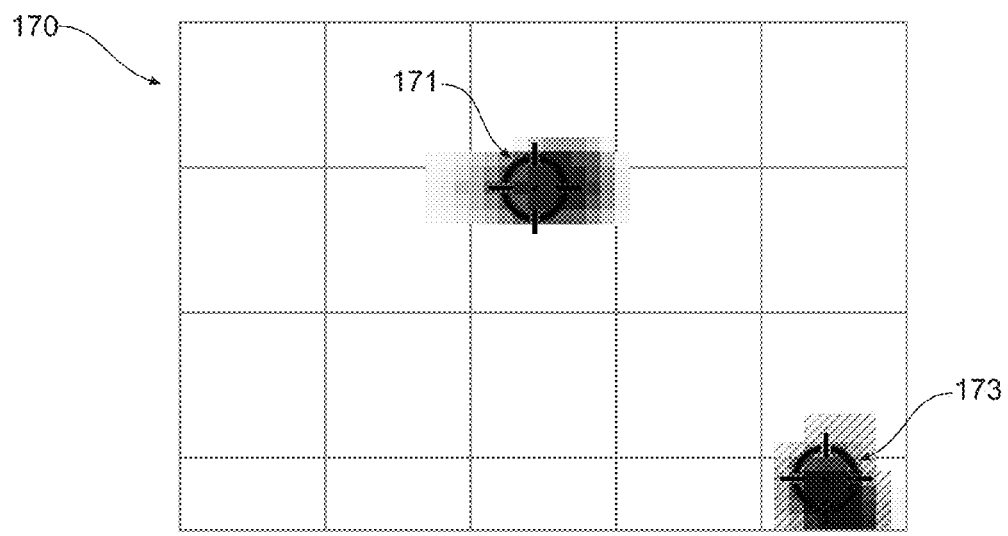
FIG. 11 depicts one example when more than one identifications are displayed.

FIG. 11 shows a display 170 with two identifications (indicated by two cursors 171 and 173). The group of markers around cursor 171 may have a different colour scheme or colour than that of the group of markers around cursor 173.

Figure 12:
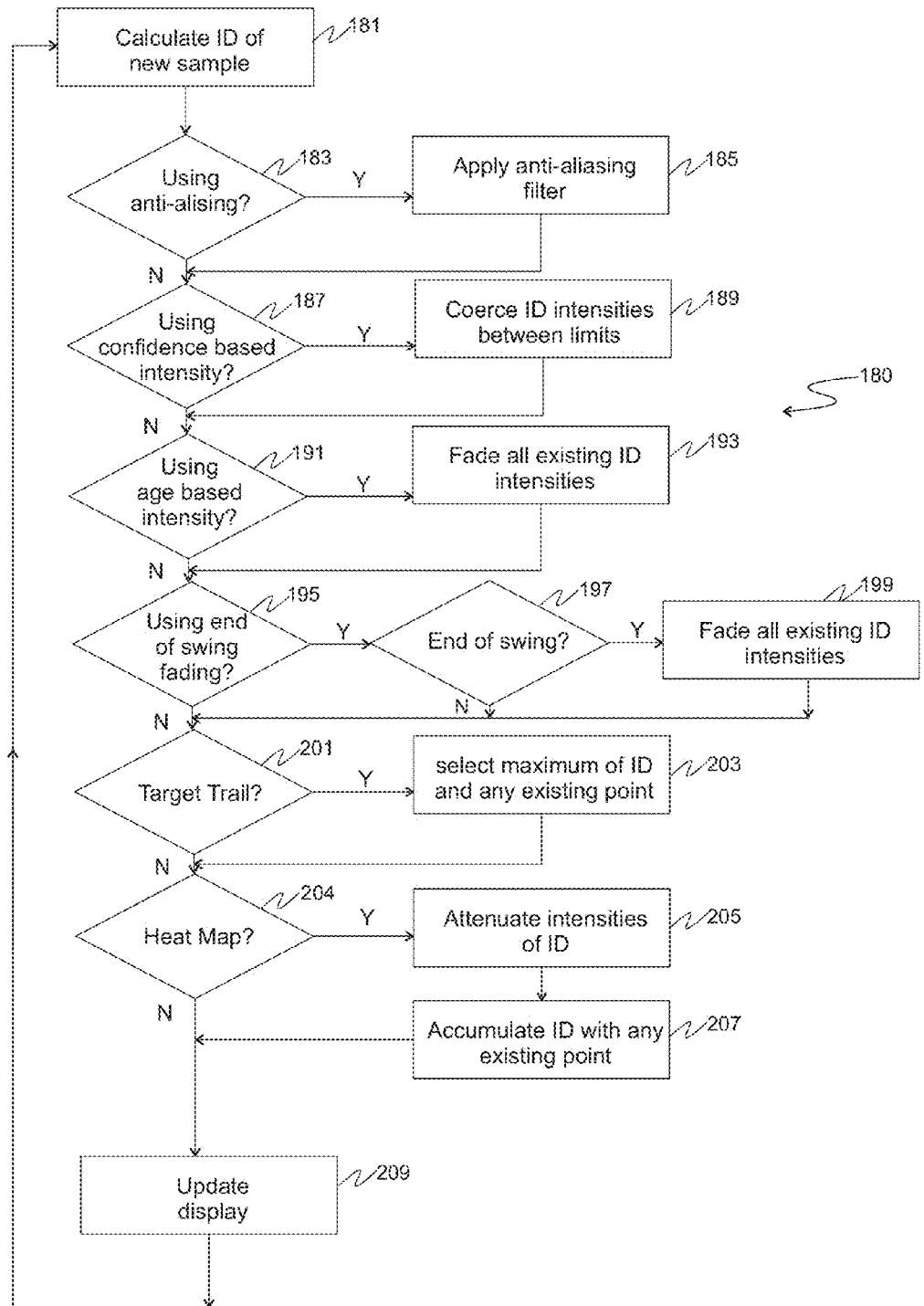
FIG. 12 depicts an embodiment of the processing within a metal detector implementing functions to present the results in a display to a user of a metal detector.

FIG. 12 shows an embodiment of the processing within a metal detector implementing functions described herein to present the results on a display to a user of a metal detector. This figure does not present the signal processing of the receive signal and the channels, and does not present the determination of one or more identifications from the estimations, both of which can take various forms known to a person skilled in the art. Rather, it shows generally steps involved between calculating an identification (ID) of new sample 181 and displaying the ID to a user through updating display 209. The ID can either be of an estimate or an identification. The term 'new sample' generally means data from a new time interval as exemplified by 61 in FIG. 5a, and may be dependent on data from one or more channels. As discussed above, such a step 181 is triggered when a target signal is above a threshold value.

After the step of 181, the processing checks whether the function of using anti-aliasing 183 is selected. If "yes", one or more anti-aliasing or smoothing filters are applied 185. An example of an effect of such a step can be observed with reference to FIGS. 5b and 5c. If "no", or upon the completion of step 185, the processing then checks whether the function of using confidence-based intensity is selected 187. If "yes", the intensity of the marker representing the calculated ID is coerced 189. An example of an effect of such a step can be observed with reference to FIGS. 8a to 8c. If "no", or upon completion of step 189, the processing then checks whether the function of using age-based intensity is selected 191. If "yes", the intensities of all existing IDs displayed as markers on a display are faded 193 in a predetermined manner. An example of an effect of such a step can be observed with reference to FIGS. 9a and 9b. If "no", or upon completion of step 193, the processing then checks whether the function of using end-of-swing fading 195 is selected. If "yes", the processing will again check whether an end of swing is detected 197. Upon confirmation of the end of swing, intensities of all existing IDs displayed as markers on a display are faded 199. If either check 195 or check 197 results in a "no", or upon completion of step 199, the processing then checks whether the mode of Target Trails is selected. If "yes", the intensity of the marker to be displayed, and intensities of all existing markers on display are calculated 203. If "no", or upon completion of step 203, the processing checks whether the mode of Heat Map is selected. If "yes", the intensity of the marker to be displayed is attenuated 205 according to a predetermined manner, and the intensity of the marker is accumulated with that of the existing markers with the same ID 207. The step of 205 is useful to avoid saturation of the intensities on the display. If "no", or upon completion of step 207, the display is updated 209. The steps above can also be re-arranged, some steps performed in parallel etc. deemed appropriate by a person skilled in the art.

A detailed description of one or more preferred embodiments of the invention is provided above along with accompanying Figures that illustrate, by way of example, the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the description above in order to provide a thorough understanding of the present invention. The present invention may be practised according to the claims without some or all of these specific details. For the purpose of clarity, technical material that is known in the technical fields related to the invention has not been described in detail so that the present invention is not unnecessarily obscured.

Throughout this specification and the claims that follow, unless the context requires otherwise, the words 'comprise' and 'include' and variations such as 'comprising' and 'including' will be understood to imply the inclusion of a stated integer or group of integers, but not the exclusion of any other integer or group of integers.

The reference to any prior art in this specification is not, and should not be taken as, an acknowledgment or any form of suggestion that such prior art forms part of the common general knowledge of the technical field.

The invention claimed is:

1. A method for detecting an electrically conductive target in a soil using a metal detector, comprising:
   generating a transmit magnetic field for transmission into the soil based on a transmit signal;
   receiving a receive magnetic field;
   providing a receive signal induced by the receive magnetic field;
   processing the receive signal to produce a processed signal;
   processing a duration of the receive signal, the duration begins after a time the processed signal exceeds a threshold value and ends after a time the processed signal no longer exceeds the threshold value, to produce more than one estimations indicative of a presence of the electrically conductive target when the target is within an influence of the transmit magnetic field; and
   presenting graphically the more than one estimations.

2. The method of claim 1, further comprising the step of:
   producing at least one identification indicative of a presence of the electrically conductive target based on one or more of the more than one estimations.

3. The method of claim 1, wherein each of the more than one estimations includes two numbers.

4. The method of claim 3, wherein each of the more than one estimations are presented graphically in a 2D form.

5. The method of claim 4, further comprising the step of:
   smoothing graphically the 2D form of each of the more than one estimations.

6. The method of claim 1, wherein each of the more than one estimates are graphically presented such that the more than one estimates graphically represent a trail.

7. The method of claim 2, comprising the step of:
   presenting graphically a cursor indicating the identification, to differentiate the identification from at least one of the more than one estimations.

8. The method of claim 1, wherein each of the more than one estimations is presented in colour and wherein an intensity of the colour is dependent on a confidence level of each of the more than one estimations.

9. The method of claim 8, wherein the confidence level is dependent on an instance of a signal-to-noise ratio of the receive signal.

10. The method of claim 1, comprising the step of:
    removing the more than one estimations after a predetermined time.

11. The method of claim 1, comprising the step of:
    removing the more than one estimations after each swing of the metal detector.

12. The method of claim 1, wherein each of the more than one estimations is presented in colour and wherein a different colour scheme is selected to indicate different electrically conductive targets detected by the metal detector.

13. The method of claim 1, wherein each of the more than one estimations is presented in colour and wherein an intensity of the colour is accumulated.

14. A metal detector configured to perform the method of claim 1.

15. A computer readable medium including instructions to perform the method of claim 1.

16. A metal detector for detecting an electrically conductive target in a soil comprising:
    a transmit coil for generating a transmit magnetic field for transmission into the soil based on a transmit signal;
    a receive coil for receiving a receive magnetic field, and for providing a receive signal induced by the receive magnetic field;
    a processing unit for processing the receive signal to produce a processed signal, and for processing a duration of the receive signal, the duration begins after a time the processed signal exceeds a threshold value and ends after a time the processed signal no longer exceeds the threshold value, to produce more than one estimations indicative of a presence of the electrically conductive target when the target is within an influence of the transmit magnetic field; and
    a display for presenting graphically the more than one estimations.

* * * * *